United States Patent
Yang et al.

(10) Patent No.: US 11,148,226 B2
(45) Date of Patent: Oct. 19, 2021

(54) MULTI-BEAM LASER SPOT WELDING OF COATED STEELS

(71) Applicant: GM GLOBAL TECHNOLOGY OPERATIONS LLC, Detroit, MI (US)

(72) Inventors: David Yang, Shanghai (CN); Wu Tao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 480 days.

(21) Appl. No.: 16/312,141

(22) PCT Filed: Jul. 14, 2016

(86) PCT No.: PCT/CN2016/089974
§ 371 (c)(1),
(2) Date: Dec. 20, 2018

(87) PCT Pub. No.: WO2018/010132
PCT Pub. Date: Jan. 18, 2018

(65) Prior Publication Data
US 2019/0240780 A1    Aug. 8, 2019

(51) Int. Cl.
*B23K 26/322* (2014.01)
*B23K 26/067* (2006.01)
(Continued)

(52) U.S. Cl.
CPC ........ *B23K 26/322* (2013.01); *B23K 26/0676* (2013.01); *B23K 26/22* (2013.01); *B23K 26/244* (2015.10); *B23K 2101/35* (2018.08)

(58) Field of Classification Search
CPC ................ B23K 26/322; B23K 26/244; B23K 26/0676; B23K 26/22; B23K 2101/35
(Continued)

(56) References Cited

U.S. PATENT DOCUMENTS 3,881,084 A * 4/1975 Baardsen ........... B23K 15/0093
219/121.64
4,023,005 A * 5/1977 Bolin ..................... B23K 26/18
219/121.64
(Continued)

FOREIGN PATENT DOCUMENTS

CN        101695790 A      4/2010
CN        102126086 A      7/2011
(Continued)

OTHER PUBLICATIONS

International Search Report and Written Opinion for application No. PCT/CN20161089974 dated Apr. 10, 2017, 8 pages.

*Primary Examiner* — Jimmy Chou
(74) *Attorney, Agent, or Firm* — Harness, Dickey & Pierce, P.L.C.

(57) ABSTRACT

A method of laser spot welding a workpiece stack-up (10) that includes at least two overlapping steel workpieces (12, 14, 150) is disclosed. The method includes directing a plurality of laser beams (24, 24', 24") at the top surface (20) of the workpiece stack-up to create a molten steel weld pool (92) that penetrates into the stack-up. The molten steel weld pool is then grown to penetrate further into the stack-up by increasing an overall combined irradiance of the laser beams while reducing the total projected sectional area (88) of the laser beams at a plane of the top surface of the workpiece stack-up. Increasing the overall combined irradiance of the laser beams may be accomplished by moving the focal points (66, 66', 66") of the laser beams closer to the top surface or by reducing the mean angle of incidence (86) of the laser beams so as to reduce the eccentricity of the individual projected sectional areas of the laser beams.

20 Claims, 4 Drawing Sheets

(51) Int. Cl.
*B23K 26/22* (2006.01)
*B23K 26/244* (2014.01)
*B23K 101/34* (2006.01)

(58) Field of Classification Search
USPC .................................. 219/121.63, 121.64
See application file for complete search history.

(56) References Cited

U.S. PATENT DOCUMENTS

| | | | | |
|---|---|---|---|---|
| 4,642,446 | A * | 2/1987 | Pennington | B23K 35/004 219/121.64 |
| 4,697,061 | A * | 9/1987 | Spaeter | B23K 26/18 219/121.64 |
| 5,142,119 | A * | 8/1992 | Hillman | B23K 26/123 219/121.64 |
| 5,155,323 | A * | 10/1992 | Macken | B23K 26/0608 219/121.63 |
| 5,183,991 | A * | 2/1993 | Arai | B23K 26/323 219/121.64 |
| 5,183,992 | A * | 2/1993 | Bilge | B23K 26/32 219/121.64 |
| 5,268,556 | A * | 12/1993 | Coyle, Jr. | B23K 26/32 219/121.76 |
| 5,343,014 | A * | 8/1994 | Ogino | B23K 26/32 219/121.64 |
| 5,347,528 | A * | 9/1994 | Haruta | B23K 26/06 372/25 |
| 5,389,761 | A * | 2/1995 | Kresse, Jr. | B23K 11/163 219/78.14 |
| 5,591,359 | A * | 1/1997 | Saitou | B23K 15/006 219/121.64 |
| 5,603,853 | A * | 2/1997 | Mombo-Caristan | B23K 15/006 219/121.64 |
| 5,841,097 | A * | 11/1998 | Esaka | B23K 26/067 219/121.63 |
| 6,359,252 | B1 * | 3/2002 | Sanjeu | B23K 15/0053 219/121.64 |
| 6,608,278 | B1 * | 8/2003 | Xie | B23K 26/0608 219/121.64 |
| 6,646,225 | B1 * | 11/2003 | Wang | B23K 26/0604 219/121.64 |
| 6,740,845 | B2 * | 5/2004 | Stol | B23K 26/26 219/121.64 |
| 6,750,421 | B2 * | 6/2004 | Hermann | B23K 26/0626 219/121.64 |
| 6,932,879 | B2 * | 8/2005 | Ely | B23K 26/32 156/87 |
| 7,693,696 | B2 * | 4/2010 | Forrest | B23K 26/323 703/7 |
| 8,253,062 | B2 * | 8/2012 | Forrest | B23K 26/0622 219/121.64 |
| 9,676,061 | B2 * | 6/2017 | Canourgues | C21D 6/005 |
| 9,944,048 | B2 * | 4/2018 | Nishikawa | B23K 26/244 |
| 10,668,570 | B2 * | 6/2020 | Schmit | B23K 9/167 |
| 10,688,595 | B2 * | 6/2020 | Yang | B23K 26/244 |
| 10,828,729 | B2 * | 11/2020 | Cretteur | C21D 9/48 |
| 2002/0142184 | A1 * | 10/2002 | Mazumder | B23K 26/32 428/594 |
| 2002/0144984 | A1 * | 10/2002 | Mori | B23K 26/244 219/121.64 |
| 2003/0217993 | A1 * | 11/2003 | Stol | B23K 26/26 219/121.64 |
| 2004/0031561 | A1 * | 2/2004 | Ely | B23K 26/323 156/272.8 |
| 2004/0173587 | A1 * | 9/2004 | Musselman | B23K 26/0093 219/121.64 |
| 2004/0200813 | A1 * | 10/2004 | Alips | B23K 26/067 219/121.63 |
| 2005/0121426 | A1 * | 6/2005 | Wang | B23K 26/244 219/121.64 |
| 2006/0278618 | A1 * | 12/2006 | Forrest | B23K 26/0608 219/121.64 |
| 2008/0302768 | A1 * | 12/2008 | Mazumder | B23K 26/60 219/121.64 |
| 2009/0220815 | A1 * | 9/2009 | Canourgues | C22C 38/02 428/583 |
| 2009/0236321 | A1 * | 9/2009 | Hayashi | H01R 4/029 219/121.64 |
| 2009/0283505 | A1 * | 11/2009 | Naumovski | C10M 169/04 219/121.64 |
| 2012/0160815 | A1 * | 6/2012 | Hayashimoto | B23K 26/244 219/121.64 |
| 2013/0087540 | A1 * | 4/2013 | Gu | B23K 26/354 219/121.64 |
| 2014/0003860 | A1 * | 1/2014 | Evangelista | B23K 26/60 403/270 |
| 2014/0144893 | A1 * | 5/2014 | Yang | B23K 9/0026 219/121.64 |
| 2015/0336212 | A1 * | 11/2015 | Hisada | B23K 26/082 219/121.64 |
| 2016/0031042 | A1 * | 2/2016 | Gietzelt | B23K 31/02 403/271 |
| 2016/0045970 | A1 * | 2/2016 | Garcia | B23K 26/322 219/121.64 |
| 2016/0318127 | A1 * | 11/2016 | Gu | B23K 26/144 |
| 2016/0332256 | A1 * | 11/2016 | Gu | B23K 26/144 |
| 2017/0001261 | A1 * | 1/2017 | Fujiwara | B23K 26/244 |
| 2017/0095886 | A1 * | 4/2017 | Gu | B23K 26/322 |
| 2018/0141158 | A1 * | 5/2018 | Yang | B23K 26/244 |
| 2018/0304405 | A1 * | 10/2018 | Yang | B23K 26/22 |
| 2019/0262942 | A1 * | 8/2019 | Haug | B23K 26/0608 |
| 2019/0375046 | A1 * | 12/2019 | Grimm | B23K 26/062 |
| 2020/0094350 | A1 * | 3/2020 | Pan | B23K 26/0876 |
| 2020/0316713 | A1 * | 10/2020 | Yang | B23K 26/0736 |
| 2020/0353983 | A1 * | 11/2020 | Alvarez | C22C 38/002 |
| 2020/0384574 | A1 * | 12/2020 | Nishii | B23K 26/26 |
| 2021/0053152 | A1 * | 2/2021 | Vierstraete | B23K 26/073 |

FOREIGN PATENT DOCUMENTS

| | | |
|---|---|---|
| JP | S60177983 A | 9/1985 |
| WO | 0117722 A1 | 9/2000 |
| WO | 0066314 A1 | 11/2000 |
| WO | 2013110214 A1 | 8/2013 |
| WO | 2016032416 A1 | 3/2016 |
| WO | 2016192039 A1 | 12/2016 |
| WO | 2017035728 A1 | 3/2017 |
| WO | 2017035729 A1 | 3/2017 |
| WO | 2017075808 A1 | 5/2017 |
| WO | 2017156723 A1 | 9/2017 |
| WO | 2017173650 A1 | 10/2017 |
| WO | 2017173833 A1 | 10/2017 |
| WO | 2017177410 A1 | 10/2017 |
| WO | 2017177411 A1 | 10/2017 |

* cited by examiner

MULTI-BEAM LASER SPOT WELDING OF COATED STEELS

TECHNICAL FIELD

The technical field of this disclosure relates generally to laser welding and, more particularly, to a method of laser spot welding together two or more overlapping steel workpieces with multiple laser beams.

BACKGROUND

Laser spot welding is a metal joining process in which, conventionally, a single laser beam is directed at a metal workpiece stack-up to provide a concentrated energy source capable of effectuating a weld joint between the overlapping constituent metal workpieces. In general, two or more metal workpieces are first aligned and stacked relative to one another such that their faying surfaces overlap and confront to establish a faying interface (or faying interfaces) that extends through an intended weld site. A laser beam is then directed towards and impinges a top surface of the workpiece stack-up. The heat generated from the absorption of energy from the laser beam initiates melting of the metal workpieces and creates a molten metal weld pool within the workpiece stack-up. And, if the power density of the laser beam is high enough, a keyhole is produced within the workpiece stack-up. A keyhole is a column of vaporized metal, which may include plasma, derived from the metal workpieces. The keyhole is surrounded by the molten metal weld pool and is an effective absorber of energy from the laser beam, thus allowing for deep and narrow penetration of the weld pool into the stack-up compared to instances in which a keyhole is not present.

The laser beam creates the molten metal weld pool in very short order upon impinging the top surface of the workpiece stack-up. Once created, the molten metal weld pool grows as the laser beam continues to deliver energy into the workpiece stack-up. The molten metal weld pool eventually grows to penetrate through the metal workpiece impinged by the laser beam and into the underlying metal workpiece or workpieces to a depth that intersects each of the established faying interfaces. The general shape and penetration depth of the metal molten weld pool can be managed by controlling various characteristics of the laser beam including its power and focal position. When the molten metal weld pool has stabilized and reached the desired penetration depth in the workpiece stack-up, the transmission of the laser beam is ceased so that energy is no longer transmitted to the workpiece stack-up at the weld site. The molten metal weld pool quickly cools and solidifies (and collapses the keyhole if present) to form a laser spot weld joint comprised of resolidified composite workpiece material derived from each of the workpieces penetrated by molten metal weld pool. The resolidified composite workpiece material of the laser spot weld joint autogenously fusion welds the overlapping workpieces together.

The automotive industry is interested in using laser spot welding to manufacture parts that can be installed on a vehicle. In one example, a vehicle door body may be fabricated from an inner door panel and an outer door panel that are joined together by a plurality of laser spot weld joints. The inner and outer door panels are first stacked relative to each other and secured in place by clamps. A laser beam is then sequentially directed at multiple weld sites around the stacked panels in accordance with a programmed sequence to form the plurality of laser spot weld joints. The process of laser spot welding inner and outer door panels—as well as other vehicle component parts such as those used to fabricate hoods, deck lids, body structures such as body sides and cross-members, load-bearing structural members, engine compartments, etc.—is typically an automated process that can be carried out quickly and efficiently. The aforementioned desire to laser spot weld metal workpieces together is not unique to the automotive industry; indeed, it extends to other industries that may also utilize laser welding including the aviation, maritime, railway, and building construction industries, among others.

The use of laser spot welding to join together coated metal workpieces can present challenges. For example, steel workpieces often include a zinc-based surface coating (e.g., zinc or a zinc-iron alloy) for corrosion protection. Zinc has a boiling point of about 906° C., while the melting point of the underlying steel substrate it coats is typically greater than 1300° C. Thus, when a steel workpiece that includes a zinc-based surface coating is laser spot welded, high-pressure zinc vapors are readily produced at the surfaces of the steel workpiece and have a tendency to complicate the laser spot welding process. In particular, the zinc vapors produced at the faying interface(s) of the steel workpieces can diffuse into the molten steel weld pool created by the laser beam unless an alternative escape outlet is provided through the workpiece stack-up. When an adequate escape outlet is not provided, zinc vapors may remain trapped in the molten steel as it cools and solidifies, which may lead to defects in the resulting laser spot weld joint, such as porosity, as well as other weld joint discrepancies including blowholes and spatter. These weld joint deficiencies, if sever enough, can unsatisfactorily degrade the mechanical properties of the laser spot weld joint.

To deter high-pressure zinc vapors from diffusing into the molten steel weld pool, some manufacturing procedures call for laser scoring or mechanical dimpling at least one of the two steel workpieces at each faying interface where a zinc-based coating is present before laser spot welding is conducted. The laser scoring or mechanical dimpling processes create spaced apart protruding features on the faying surface of each steel workpiece that are processed in such a way. Consequently, when the scored/dimpled steel workpiece is stacked-up within the workpiece stack-up, the protruding features impose a gap of about 0.1-0.2 millimeters between the faying surface on which they have been formed and the confronting faying surface of the adjacent steel workpiece, which provides an escape path to guide zinc vapors along the established faying interface away from the weld site. But the formation of these protruding features adds an additional step to the overall laser spot welding process and is believed to contribute to the occurrence of undercut weld joints.

Steel workpieces that are used in manufacturing practices may also include other types of surface coatings for performance-related reasons in addition to, or lieu of, zinc-based coatings. Other notable surface coatings include aluminum-based coatings such as unalloyed aluminum, an aluminum-silicon alloy, an aluminum-zinc alloy, or an aluminum-magnesium alloy, to name but a few examples. Unlike zinc, these surface coatings do not boil at a temperature below the melting point of steel, so they are unlikely to produce high-pressure vapors at the faying interface(s) of the workpiece stack-up. Notwithstanding this fact, these surface coatings can be melted, especially if a keyhole is present, and, when in a molten state, can combine with the molten steel derived from the bulk of the steel workpieces. The introduction of such disparate molten materials into the molten steel weld pool has the potential to degrade the mechanical properties of the laser spot weld joint. Molten aluminum or aluminum alloys (e.g., AlSi or AlMg alloys), for instance, can dilute the steel content of the molten steel weld pool and form brittle Fe—Al intermetallic phases within the weld joint as well as negatively affect the cooling behavior of the molten steel weld pool. It would thus be a welcome addition to the art if two or more steel workpieces—at least one of which includes a surface coating—could be laser spot welded together in a way that mitigates the likelihood that weld defects derived from the surface coating(s) will accumulate within the laser spot weld joint and negatively affect its strength.

SUMMARY OF THE DISCLOSURE

A method of laser spot welding a workpiece stack-up that includes overlapping steel workpieces is disclosed. The workpiece stack-up includes two or more steel workpieces, and at least one of those steel workpieces (and possibly all of the steel workpieces) includes a surface coating. The surface coating may be comprised of a zinc-based material or an aluminum-based material, and preferably has a thickness that lies within the range of 2 μm to 50 μm. While any of these surface coating(s) may be applied to an underlying base steel substrate for a variety of reasons—a non-limiting list of reasons being to improve corrosion protection, impart strength, and/or improve formability—their presence can be a source of weld defects in the laser spot weld joint. The disclosed laser spot welding method minimizes the impact that surface coatings may have on the laser spot weld joint without requiring but of course not prohibiting—the practice of certain more conventional procedures such as, for example, the intentional imposition of gaps between the steel workpieces at the faying interface where the surface coating is present by way of laser scoring or mechanical dimpling.

To begin, the laser spot welding method involves providing a workpiece stack-up that includes two or more overlapping steel workpieces (e.g, two, three, or four overlapping steel workpieces). The steel workpieces are fitted and superimposed on each other such that a faying interface is formed between the faying surfaces of each pair of adjacent overlapping steel workpieces. For example, in one embodiment, the workpiece stack-up includes first and second steel workpieces having first and second faying surfaces, respectively, that overlap and confront one another to establish a single faying interface. In another embodiment, the workpiece stack-up includes an additional third steel workpiece disposed between the first and second steel workpieces. In this way, the first and second steel workpieces have first and second faying surfaces, respectively, that overlap and confront opposed faying surfaces of the third steel workpiece to establish two faying interfaces. When a third steel workpiece is present, the first and second steel workpieces may be separate and distinct parts or, alternatively, they may be different portions of the same part, such as when an edge of one part is folded over a free edge of another part.

After the workpiece stack-up is provided, a plurality laser beams is directed at, and impinges, a top surface of the workpiece stack-up at a weld site. The overall combined irradiance of the laser beams has an initial level when the laser beams are first trained at the top surface. This initial overall combined irradiance level of the laser beams is sufficient to create a molten steel weld pool that penetrates into the workpiece stack-up. At some point after the molten steel weld pool is created, the overall combined irradiance of the laser beams is increased to an elevated level that grows the molten steel weld pool and causes it to penetrate into the workpiece stack-up towards the bottom surface. The molten steel weld pool penetrates far enough into the workpiece stack-up that it intersects each faying interface established within the stack-up. In some embodiments, the molten steel weld pool penetrates into the workpiece stack-up to a depth within the second steel workpiece, and in other embodiments the molten steel weld pool penetrates all the way through the second steel workpiece and thus breaches the bottom surface of stack-up. Increasing the overall combined irradiance of the laser beams during growth of the molten steel weld pool is believed to place the molten steel weld pool in a better condition for solidification into a laser spot weld joint with good strength and other mechanical properties.

The overall combined irradiance of the laser beams may be increased from its initial level to its elevated level by reducing the total projected sectional area of the laser beams—which is the surface area provided when the individual sectional areas of the laser beams are combined—at a plane of the top surface of the workpiece stack-up. For example, in one embodiment, the focal points of the laser beams may be moved along their longitudinal beam axes relative to the top surface of the workpiece stack-up such that a more focused portion of each beam intersects the plane of the top surface. As another example, the mean angle of incidence of the plurality of laser beams may be decreased to reduce the eccentricity of the individual projected sectional areas of the laser beams (that together constitute the total projected sectional area of the laser beams) at the plane of the top surface. The overall combined irradiance of the laser beams during creation and growth of the molten steel weld pool, moreover, may be controlled to operate in either conduction welding mode or keyhole welding mode. In conduction welding mode, the energy of the laser beams is conducted as heat through the steel workpieces to create only the molten steel weld pool. In keyhole welding mode, the laser beams vaporize the steel workpieces and produce a keyhole or keyholes in the immediate vicinity of the laser beams within the molten steel weld pool.

After the molten steel weld pool has penetrated into the workpiece stack-up far enough to intersect the faying interface(s), the transmission of the laser beams is ceased at the weld site. This may be done without first changing the current status of the total projected sectional area of the laser beams or, in other instances, it may be done after increasing the total projected sectional area of the laser beams at a plane of the top surface of the workpiece stack-up so as to decrease the overall combined irradiance of the laser beams. Upon ceasing transmission of the laser beams, the keyhole (if present) collapses and the molten steel weld pool cools and solidifies into a laser spot weld joint comprised of resolidified composite steel workpiece material derived from each of the steel workpieces penetrated by the molten steel weld pool. The resolidified composite steel workpiece material autogenously fusion welds the overlapping steel workpieces together at the weld site. And, unlike conventional laser spot welding practices, the laser spot weld joint formed according to the disclosed method includes provisions related to the mechanics of the laser beams that help keep the surface coatings of the one or more steel workpieces from negatively affecting the strength and other mechanical properties of the laser spot weld joint to an unsatisfactory extent. The ability to inhibit the surface coatings from contributing to the formation of weld defects within the laser spot weld joint ultimately leads to strong and durable weld joints that can be consistently attained.

DETAILED DESCRIPTION

Figure 1:
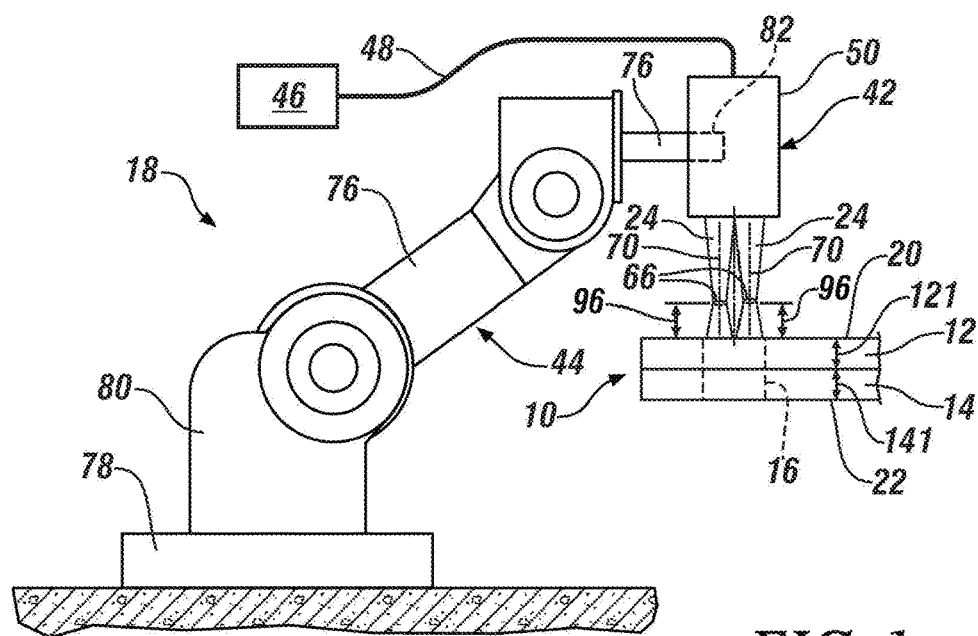
FIG. 1 is a schematic view of an embodiment of a conventional laser welding apparatus, outfitted with a beam splitter, in which multiple laser beams impinge a top surface of a workpiece stack-up that includes two or more overlapping steel workpieces as part of a laser spot welding method that produces a laser spot weld joint within the stack-up.

The disclosed method of laser spot welding a workpiece stack-up comprised of two or more overlapping steel workpieces calls for increasing an overall combined irradiance of a plurality of laser beams trained at a top surface of the stack-up at a weld site during growth of a created molten steel weld pool. Any type of conventional laser welding apparatus may be employed to direct the multiple laser beams towards the top surface of the workpiece stack-up and to increase the overall combined irradiance of the laser beams. Moreover, the overall combined irradiance range of the multiple laser beams may be controlled to perform the method in either conduction welding mode or keyhole welding mode. The laser beams may thus be solid-state laser beams or gas laser beams depending on the characteristics of the steel workpieces being joined and the laser welding mode desired to be practiced. Some notable solid-state lasers that may be used are a fiber laser, a disk laser, a diode laser, and a Nd:YAG laser, and a notable gas laser that may be used is a $CO_2$ laser, although other types of lasers may certainly be used so long as they are able to create the molten steel weld pool.

The laser spot welding method may be performed on a variety of workpiece stack-up configurations. For example, the disclosed method may be used in conjunction with a "2T" workpiece stack-up (FIGS. 1-13) that includes two overlapping and adjacent steel workpieces, or it may be used in conjunction with a "3T" workpiece stack-up (FIGS. 14-16) that includes three overlapping and adjacent steel workpieces. Still further, in some instances, the disclosed method may be used in conjunction with a "4T" workpiece stack-up (not shown) that includes four overlapping and adjacent steel workpieces. Additionally, the several steel workpieces included in the workpiece stack-up may be of different strengths and grades, and may have similar or dissimilar thicknesses at the weld site, if desired. The laser spot welding method is carried out in essentially the same way to achieve the same results regardless of whether the workpiece stack-up includes two or more overlapping steel workpieces. Any differences in workpiece stack-up configurations can be accommodated by adjusting the characteristics of the laser beams such as, for instance, the power of the laser beams, the positioning of the focal points of the laser beams throughout the method, the amount of time the laser beams are trained on the workpiece stack-up at the weld site, or some combination of those characteristics.

Referring now to FIGS. 1-13, a method of laser spot welding a workpiece stack-up 10 is shown in which the stack-up 10 includes at least a first steel workpiece 12 and a second steel workpiece 14 that overlap at a weld site 16 where laser spot welding is conducted using a conventional laser welding apparatus 18. The first and second steel workpieces 12, 14 provide a top surface 20 and a bottom surface 22, respectively, of the workpiece stack-up 10. The top surface 20 of the workpiece stack-up 10 is made available to the conventional laser welding apparatus 18 and is accessible by a plurality of laser beams 24 emanating from the laser welding apparatus 18. And since only single side access is needed to conduct conventional laser welding, there is no need for the bottom surface 22 of the workpiece stack-up 10 to be made available to the laser welding apparatus 18 in the same way as the top surface 20. Moreover, while only one weld site 16 is depicted in the Figures for the sake of simplicity, skilled artisans will appreciate that laser spot welding in accordance with the disclosed method can be practiced at multiple different weld sites spread out throughout the same workpiece stack-up.

The workpiece stack-up 10 may include only the first and second steel workpieces 12, 14, as shown in FIGS. 1-13. Under these circumstances, and as shown best in FIGS. 3-4, the first steel workpiece 12 includes an exterior outer surface 26 and a first faying surface 28, and the second steel workpiece 14 includes an exterior outer surface 30 and a second faying surface 32. The exterior outer surface 26 of the first steel workpiece 12 provides the top surface 20 of the workpiece stack-up 10 and the exterior outer surface 30 of the second steel workpiece 14 provides the oppositely-facing bottom surface 22 of the stack-up 10. And, since the two steel workpieces 12, 14 are the only workpieces present in the workpiece stack-up 10, the first and second faying surfaces 28, 32 of the first and second steel workpieces 12, 14 overlap and confront to establish a faying interface 34 that extends through the weld site 16. In other embodiments, one of which is described below in connection with FIGS. 14-16, the workpiece stack-up 10 may include an additional steel workpiece disposed between the first and second steel workpieces 12, 14 to provide the stack-up 10 with three steel workpieces instead of two.

The term "faying interface" is used broadly in the present disclosure and is intended to encompass a wide range of overlapping relationships between the confronting first and second faying surfaces 28, 32 that can accommodate the practice of laser spot welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer such as a structural adhesive—and thus do not experience the type of interfacial abutment that typifies direct contact—yet are in close enough proximity that laser spot welding can be practiced. As another example, the faying surfaces 28, 32 may establish the faying interface 34 by being separated by gaps that are purposefully imposed. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the faying surfaces 28, 32 spaced apart outside of and around the contact points by up to 1.0 mm and, preferably, between 0.2 mm and 0.8 mm.

Figure 3:
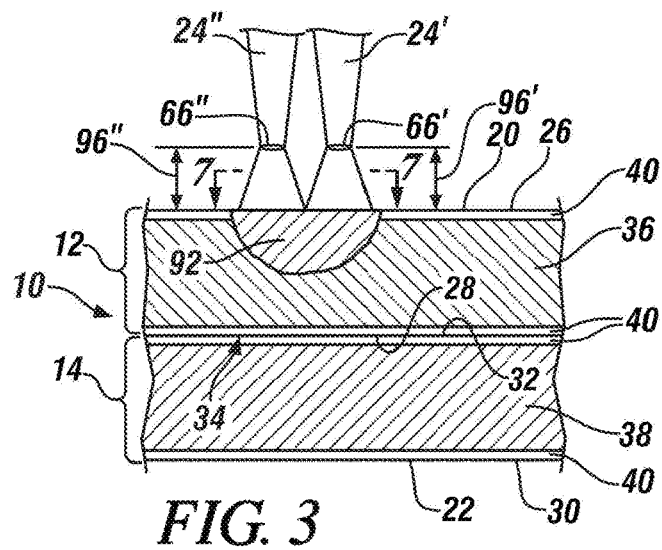
FIG. 3 is a cross-sectional side view of the workpiece stack-up shown in FIGS. 1-2 during laser spot welding in which the laser beams have an initial overall combined irradiance level at the top surface of the workpiece stack-up according to one embodiment.
Figure 4:
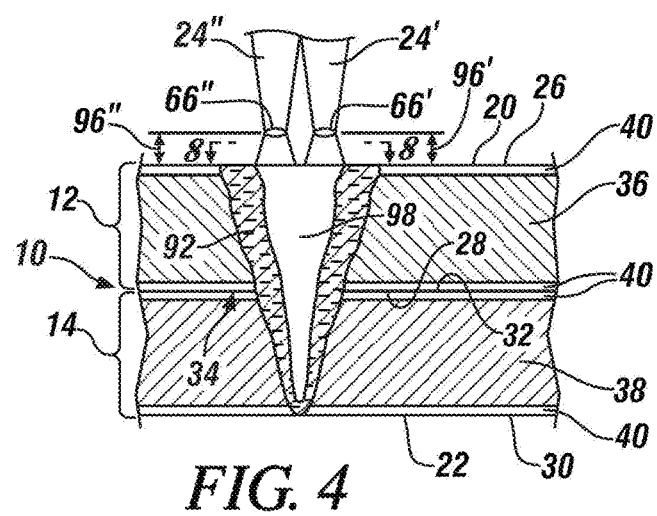
FIG. 4 is a cross-sectional side view of the workpiece stack-up shown in FIG. 3 during laser spot welding in which the overall combined irradiance of the laser beams at the top surface of the stack-up has been increased from its initial level (FIG. 3) to an elevated level, and wherein the elevated overall combined irradiance level of the laser beams is achieved by moving the focal points of the laser beams relative to the top surface of the workpiece stack-up.

Referring still to FIGS. 3-4, the first steel workpiece 12 includes a first base steel substrate 36 and the second steel workpiece 14 includes a second base steel substrate 38. At least one of the first or second base steel substrates 36, 38—and possibly both—may include a surface coating 40. Here, each of the first and second base steel substrates 36, 38 is coated with a surface coating 40 that, in turn, provides the steel workpieces 12, 14 with their respective exterior outer surfaces 26, 30 and their respective faying surfaces 28, 32. In other embodiments, only the first base steel substrate 36 includes a surface coating 40 while the second base steel substrate 36 is uncoated or bare, or only the second base steel substrate 38 includes the surface coating 40 while the first base steel substrate 36 is uncoated or bare. The surface coating(s) 40 may be employed on one or both of the base steel substrates 36, 38 for various reasons including corrosion protection, strength enhancement, and/or to improve processing, among other reasons. The first and second steel workpieces 12, 14 have thicknesses 121, 141 (FIG. 1) that may be the same or different from one another.

Each of the base steel substrates 36, 38 may be separately composed of any of a wide variety of steels including a low carbon steel (also commonly referred to as mild steel), interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when press-hardened steel (PHS) is included in the steel workpiece(s) 12, 14. Moreover, each of the first and second base steel substrates 36, 38 may have been treated to obtain a particular set of mechanical properties, including being subjected to heat-treatment processes such as annealing, quenching, and/or tempering. The first and second steel workpieces 12, 14 (whether coated or uncoated) may be hot or cold rolled to their final thicknesses and may be prefabricated to have a particular profile suitable for assembly into the workpiece stack-up 10.

The surface coating 40 present on one or both of the base steel substrates 36, 38 is preferably comprised of a zinc-based material or an aluminum-based material. Some examples of a zinc-based material include zinc or a zinc alloy such as a zinc-iron alloy or a zinc-nickel alloy. Some examples of an aluminum-based material include unalloyed aluminum, an aluminum-silicon alloy, an aluminum-zinc alloy, or an aluminum-magnesium alloy. A coating of a zinc-based material may be applied by hot-dip galvanizing (zinc), electro-galvanizing (zinc), or galvannealing (zinc-iron), typically to a thickness of 2 µm to 50 µm, and a coating of an aluminum-based material may be applied by dip coating, typically to a thickness of 2 µm to 30 µm, although other coating procedures and thicknesses of the attained coatings may be employed. Taking into the account the thickness of the base steel substrates 36, 38 and their optional surface coatings 40, the first and second steel workpieces 12, 14 have thicknesses 121, 141 that preferably range from 0.4 mm to 4.0 mm, and more narrowly from 0.5 mm to 2.0 mm, at least at the weld site 16.

Figure 2:
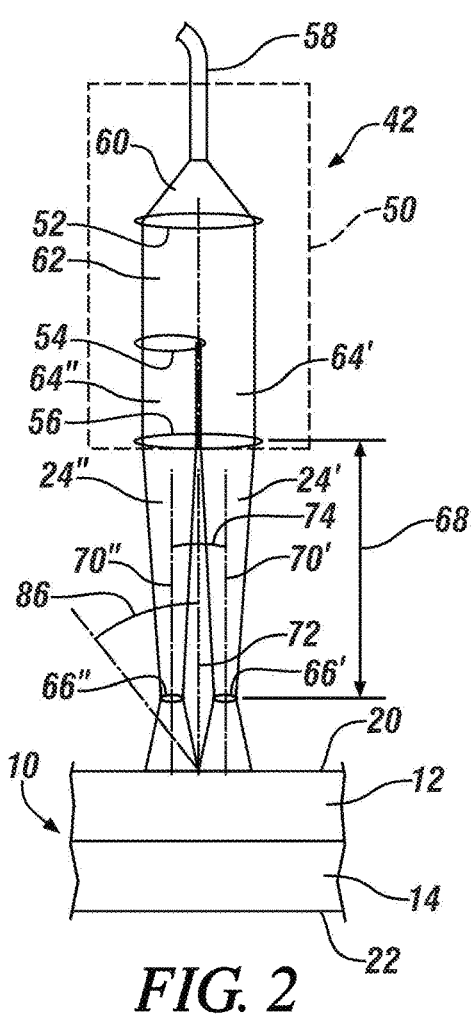
FIG. 2 is a schematic view of the laser optic welding head and a portion of the workpiece stack-up shown in FIG. 1.

Referring now to FIGS. 1-2, the conventional laser welding apparatus 18 includes a laser optic welding head 42 and a robot 44 that carries the laser optic welding head 42. The laser optic welding head 42, which is coupled to a beam generator 46 by a fiber optic cable 48, focuses and directs the laser beams 24 at the top surface 20 of the workpiece stack-up 10 which, in this embodiment, is the exterior outer surface 26 of the first steel workpiece 12. The laser beams 24 transmitted from the laser optic welding head 42 are preferably solid-state laser beams that operate with a wavelength in the near-infrared range (700 nm to 1400 nm) of the electromagnetic spectrum and are able to deliver power at a level of 0.3 kW to 50 kW each. Some examples of suitable solid-state laser beams include a fiber laser beam, a disk laser beam, and a direct diode laser beam. A preferred fiber laser beam is a diode-pumped laser beam in which the laser gain medium is an optical fiber doped with a rare earth element (e.g., erbium, ytterbium, neodymium, dysprosium, praseodymium, thulium, etc.). A preferred disk laser beam is a diode-pumped laser beam in which the gain medium is a thin laser crystal disk doped with a rare earth element (e.g., a ytterbium-doped yttrium-aluminum garnet (Yb:YAG) crystal coated with a reflective surface) and mounted to a heat sink. And a preferred direct diode laser beam is a combined laser beam (e.g., wavelength combined) derived from multiple diodes in which the gain medium is multiple semiconductors such as those based on aluminum gallium arsenide (AlGaAS) or indium gallium arsenide (InGaAS).

The laser optic welding head 42 includes a body 50 that houses a collimator 52, a beamsplitter 54, and a focusing element 56, as shown best in FIG. 2. An end 58 of the fiber optic cable 48 is received in the body 50 and delivers a diverging conical laser beam 60 that originates in the laser beam generator 46 where the gain medium/media is present along with other associated laser components. The diverging conical laser beam 60 is transformed by the collimator 52 into a collimated laser beam 62 having a constant beam diameter. The collimator 52 may be a curved lens such as a parabolic or spherical lens through which the diverging conical beam 60 can pass. After exiting the collimator 52, the collimated laser beam 62 encounters the beamsplitter 54, which may be any type of optical element that can split the single, spatially coherent collimated laser beam 62 into two or more output collimated laser beams 64. The beamsplitter 54 can be configured to split the collimated laser beam 62 in a way that renders the plurality of output collimated laser beams 64 parallel to one another or, alternatively, angled towards or away from one another. A preferred beamsplitter 54 is a refractor comprised of one or more prisms composed of fused silica or a crown glass such as BK7 borosilicate glass.

Figure 5:
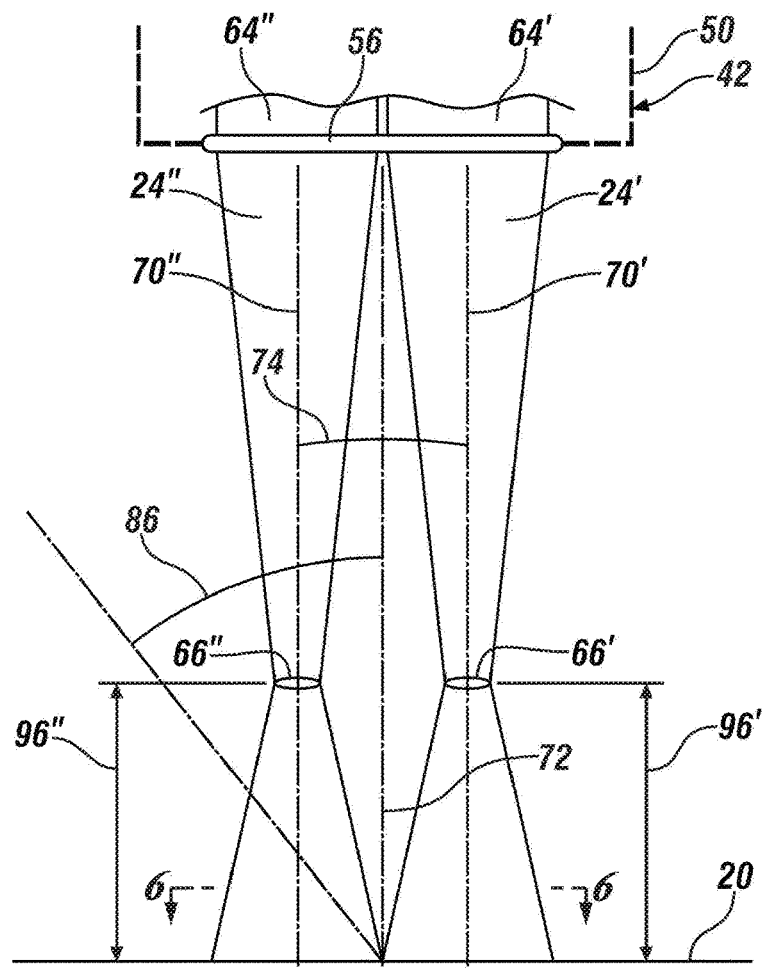
FIG. 5 is a partial magnified view of part of the laser optic welding head, including the focusing element, and the laser beams emanating from the laser optic welding head and being directed towards the top surface of the workpiece stack-up as shown in FIG. 2.

The output collimated laser beams 64 are focused by the focusing element 56 into the plurality of working laser beams 24 that exits the laser optic welding head 42. The laser beams 24 exiting the laser optic welding head 42, in turn, are directed toward, and impinge, the top surface 20 of the workpiece stack-up 10, as depicted in FIGS. 2 and 5. The focusing element 56 narrows the beam diameter of each of the plurality of laser beams 24 to a focal point 66 that preferably has a diameter ranging from 0.1 mm to 8 mm, or more narrowly from 0.3 mm to 3 mm, and a focal length 68 that ranges from 50 mm to 350 mm. The focal length 68 of each of the laser beams 24 is the distance between the focusing element 56 where beam narrowing is initiated and the focal point 66 of the laser beam 24, as is also illustrated in FIGS. 2 and 5 for this particular embodiment of the laser optic welding head 42. Like the collimator 52, the focusing element 56 may be curved lens such as a parabolic or spherical lens through which the output collimated laser beams 64 can pass.

Each of the laser beams 24 exits the laser optic welding head 42 after interacting with the focusing element 56 and propagates forward along a longitudinal beam axis 70. The laser beams 24 impinge the top surface 20 of the workpiece stack-up 10 and have a common, mean longitudinal beam axis 72 that represents the positional average of each of the longitudinal axes 70 of the laser beams 24 (FIGS. 2 and 5). When the laser optic welding head 42 is operational and the laser beams 24 are being trained on the workpiece stack-up 10, cooling functionality installed in the welding head 42 may be initiated to help ensure the collimator 52, the beamsplitter 54, and the focusing element 56 do not overheat. The laser optic welding head 42 may also include visual monitoring equipment (not shown) having a line of sight down the longitudinal beam axes 70 of the laser beams 24 as well as other associated components and equipment. The laser optic welding head 42 shown schematically in FIGS. 1-2 and 5, and described above, as well as other design variations not specifically mentioned, are commercially available from a variety of sources. Some notable suppliers of laser optic welding heads and related laser system equipment for use with the conventional laser welding apparatus 18 include HIGHYAG (Kleinmachnow, Germany) and TRUMPF Inc. (Connecticut, USA).

The laser optic welding head 42 discussed above represents one particular way to focus and direct the plurality of laser beams 24 at the top surface 20 of the workpiece stack-up 10. Other ways may of course be implemented. For example, in one alternative embodiment, the collimator 52 and the focusing element 56 may be mirrors, instead of lenses, and the beamsplitter 54 may be also be a mirror (as opposed to a prism) such as a type of bending mirror known as a roof mirror. In another alternative embodiment, the beamsplitter 54 may be a diffractive optical element (DOE) rather than a prism-type refractor or a bending mirror. Still further, two or more laser optic welding heads similar to the one described above-minus the beamsplitter 54—may each focus and direct a laser beam at the top surface 20 of the workpiece stack-up 10 to provide the plurality of laser beams 24. In such as setup, the laser optic welding heads may be supported in a common support fixture in order to coordinate their movements relative to the workpiece stack-up 10.

In a preferred embodiment, the laser optic welding head 42 is the source of the laser beams 24 and the beamsplitter 54 included therein splits the collimated laser beam 62 into a first output collimated laser beam 64' and a second output collimated laser beam 64", as shown here in FIGS. 2-13. A refractor such as, for example, a lateral displacement beamsplitter that includes a pair of rhomboid prisms—as well as other types—can achieve such beamsplitting. The first and second output collimated laser beams 64', 64" are then focused by the focusing element 56 into corresponding first and second working laser beams 24', 24" (having focal points 66', 66") that act on the workpiece stack-up 10. The longitudinal beam axis 70' of the first laser beam 24' and the longitudinal beam axis 70" of the second laser beam 24" may be parallel, as shown here, in which case the mean longitudinal beam axis 72 is parallel to, and extends equidistantly between, each of the beam axes 70', 70" on a common plane. In another embodiment, the longitudinal beam axis 70' of the first laser beam 24' and the longitudinal beam axis 70" of the second laser beam 24" converge toward one another down their longitudinal beam axes 70', 70" at an angle 74 that preferably ranges from 0.1° to 2°. In this case, the mean longitudinal beam axis 72 extends between the two converging longitudinal beam axes 70', 70" while dividing the angle 74 between them in half on a common plane.

The robot 44 is operable to move the laser optic welding head 42 within the three-dimensional space above the top surface 20 of the workpiece stack-up 10 in order to position the laser optic welding head 42 as needed to aim the laser beams 24 at the weld site 16. In particular, the robot 44 includes a robot arm 76 and a base 78. One end 80 of the robot arm 76 is connected to the base 78 and an opposite free end of the arm 76 includes a mounting feature 82 that connects to and supports the laser optic welding head 42. The base 78 and the robot arm 76 are constructed with rotary, swivel, hinge, and/or other types of junctions that permit precise and programmable movement of the laser optic welding head 42 in three-dimensions relative to the workpiece stack-up 10 with the aid of computer-implemented control systems. As applicable here to the disclosed laser spot welding method, and as will be further described below, the robot 44 is able to move laser optic welding head 42 to (1) adjust the distance between the focal points 66 of the laser beams 24 and the top surface 20 of the workpiece stack-up 10 and/or to (2) adjust the mean angle of incidence of the laser beams 24 relative to the workpiece stack-up 10.

When practicing the disclosed laser spot welding method, the conventional laser welding apparatus 18 is used to form a laser spot weld joint 84 (FIG. 9) between the first and second steel workpieces 12, 14, as demonstrated using the first and second working laser beams 24', 24" described above and illustrated in FIGS. 1-8. To begin, and referring now to FIGS. 1-2 and 5, the robot 44 positions the laser optic welding head 42 above the top surface 20 of the workpiece stack-up 10 in the vicinity of the weld site 16. Once located, the laser beams 24', 24" are directed at, and impinge, the top surface 20 at the weld site 16 at a mean angle of incidence 86. The mean angle of incidence 86 is the angle that the mean longitudinal beam axis 72 of the laser beams 24', 24" deviates from a linear direction normal to the top surface 20 at the weld site 16. Typically, the mean angle of incidence 86 ranges from 0° (i.e., the mean longitudinal beam axis 72 of the laser beams 24', 24" is perpendicular to the top surface 20) to 45° in any direction from normality. The desired mean angle of incidence 86 of the laser beams 24', 24" may be achieved by controlling the angular alignment of the laser optic welding head 42 relative to the top surface 20 of the workpiece stack-up 10. Here, in the embodiment depicted in the FIGS. 1-2 and 5, the mean angle of incidence 86 is 0°.

Figure 6:
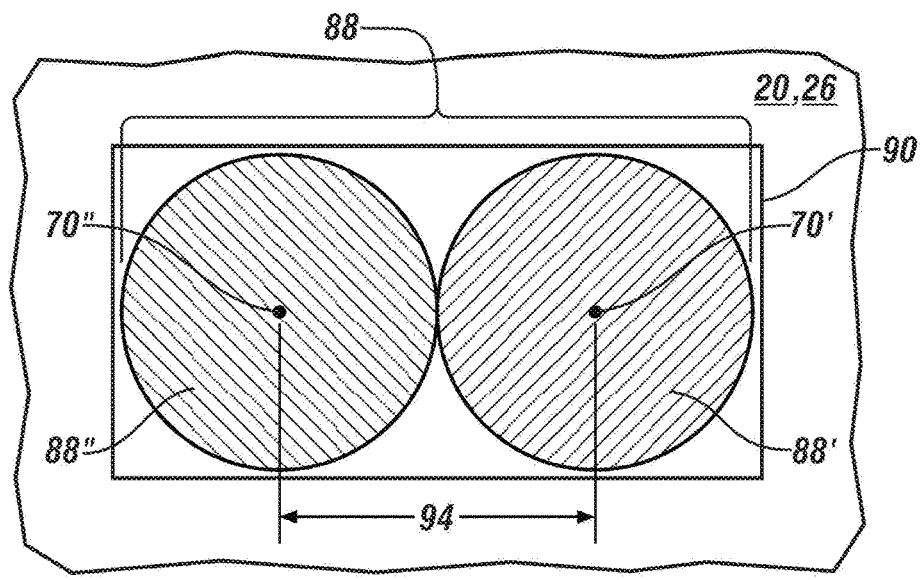
FIG. 6 is a general plan view (taken along lines 6-6 in FIG. 5) of the total projected sectional area of the laser beams at a plane of the top surface of the workpiece stack-up.
Figure 7:
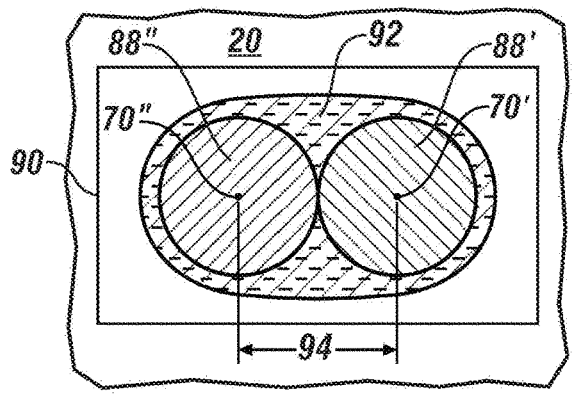
FIG. 7 is a plan view of the total projected sectional area of the laser beams at a plane of the top surface of the workpiece stack-up when the focal points of the laser beams are positioned as illustrated in FIG. 3.

The laser beams 24', 24" have an overall combined irradiance that is determined by dividing (1) the sum of the power of each laser beam 24', 24" by (2) the total projected sectional area 88 of the laser beams 24', 24" at a plane 90 of the top surface 20 of the workpiece stack-up 10, which is visually depicted in FIG. 6. The total projected sectional area 88 of the laser beams 24', 24" is the surface area at the plane 90 of the top surface 20 covered by any of the individual projected sectional area 88' of the first laser beam 24', the individual projected sectional area 88" of the second laser beam 24", or both. When the laser beams 24', 24" first impinge the top surface 20 of the workpiece stack-up 10, the overall combined irradiance of the laser beams 24', 24" has an initial level sufficient to create a molten steel weld pool 92 that penetrates into the stack-up 10, as shown in FIGS. 3 and 7. The molten steel weld pool 92 may penetrate partially through the first steel workpiece 12, and thus does not intersect the faying interface 34, when the overall combined irradiance of the laser beams 24', 24" is at the initial level, or it may intersect the faying interface 34 and penetrate into the second steel workpiece 14. The initial level of the overall combined irradiance of the laser beams 24', 24" can vary based on the compositions and thicknesses 121, 141 of the first and second steel workpieces 12, 14, but, in many instances, ranges from 500 W/cm$^2$ to 1.0×10$^6$ W/cm$^2$ or, more narrowly, from 1.0×10$^3$ W/cm$^2$ to 1.0×10$^6$ W/cm$^2$.

Establishing the initial overall combined irradiance level of the laser beams 24', 24" may be achieved by coordinating the power level of the laser beams 24', 24", the interbeam spacing of the laser beams 24', 24", and the positioning of the focal points 66', 66" of the laser beams 24', 24" relative to the top surface 20 of the workpiece stack-up 10. In particular, in this embodiment, the power level of each of the laser beams 24', 24" is set to between 0.5 kW and 50 kW or, more narrowly, to between 2 kW and 6 kW. The power levels of the laser beams 24', 24" may be the same or different. Additionally, the interbeam spacing of the laser beams 24', 24", which is a distance 94 between the longitudinal beam axes 70', 70" of the laser beams 24', 24" along the plane 90 of the top surface 20 of the workpiece stack-up 10, as illustrated in FIG. 6, may range from 0 mm to 8 mm or, more narrowly, from 0.3 mm to 3 mm. This distance 94 is also equal to the midpoints of the individual projected sectional areas 88', 88" of the laser beams 24', 24" at the plane 90 of the top surface 20 when each of the longitudinal beam axis 70' of the first laser beam 24' and the longitudinal beam axis 70" of the second laser beam 24" is oriented normal to the plane 90 of the top surface 20, thus rendering the individual projected sectional area 88', 88" of each of the laser beams 24', 24" circular in nature.

The focal points 66', 66" of each of the laser beams 24', 24" may be positioned relative to the top surface 20 of the workpiece stack-up 10 at a distance 96', 96" (i.e., the focal distance) that ranges between −300 mm and 300 mm, or more narrowly between −60 mm and 60 mm, along the longitudinal beam axes 70', 70". Here, in FIGS. 1-5, the focal points 66', 66" are positioned above the top surface 20 and, accordingly, the focal distance 96', 96" associated with each laser beam 24', 24" is a positive value. The focal points 66', 66" may of course be positioned below the top surface 20, and even below the bottom surface 22, in which case the focal distance 96', 96" of each laser beam 24', 24" would be a negative value. Moving the focal points 66', 66" of the laser beams 24', 24" toward or away from the top surface 20 of the workpiece stack-up 10 thus has the effect of decreasing or increasing, respectively, the individual projected sectional areas 88', 88" of the laser beams 24', 24" at the plane 90 of the top surface 20. At the time the initial overall combined irradiance level of the laser beams 24', 24" is established, the focal distances 96', 96" and the interbeam spacing of the laser beams 24', 24" may be set so that their individual projected sectional areas 88', 88" are separated, make peripheral contact (as depicted in FIG. 6), or partially overlap by up to 80%. When the individual projected sectional areas 88', 88" partially overlap, the calculated value of the total projected sectional area 88 of the laser beams 24', 24" is less than the sum of the individual projected sectional areas 88', 88" due to the partial overlap.

Figure 8:
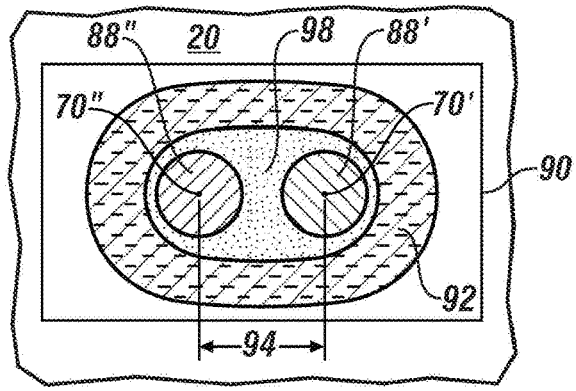
FIG. 8 is a plan view of the total projected sectional area of the laser beams at a plane of the top surface of the workpiece stack-up when the focal points of the laser beams are positioned as illustrated in FIG. 4.

After the molten steel weld pool 92 is created, the overall combined irradiance of the laser beams 24', 24" is increased to an elevated level to grow the weld pool 92 and cause it to penetrate further into the workpiece stack-up 10 towards the bottom surface 22, as shown in FIGS. 4 and 8. This involves reducing the total projected sectional area 88 of the laser beams 24', 24" at the plane 90 of the top surface 20 of the workpiece stack-up 10 by moving the focal points 66', 66" of the laser beams 24', 24" forward (if distances 96', 96" are positive) along their longitudinal beam axes 70', 70" in the propagation direction towards the top surface 20 or rearward (if distances 96', 96" are negative) along their longitudinal beam axes 70', 70" opposite to the propagation direction. The elevated overall combined irradiance level of the laser beams 24', 24" ensures that the molten steel weld pool 92 penetrates far enough into the workpiece stack-up 10 that it intersects the faying interface 34. The molten steel weld pool 92 may, for example, penetrate into the second steel workpiece 14 to a depth between its faying and exterior outer surfaces 32, 30. In other instances, the molten steel weld pool 92 penetrates all the way through the second steel workpiece 14 such that the weld pool 92 breaches the bottom surface 22 (also the exterior outer surface 30) of the workpiece stack-up 10.

The focal points 24', 24" of the laser beam 24', 24" may be moved forward or rearward along their longitudinal beam axes 70', 70" to shorten the distances 96', 96" between the focal points 66', 66" and the top surface 20 of the workpiece stack-up 10 to between −280 mm and 280 mm or, more narrowly, to between −50 mm and 50 mm to attain the elevated level of the overall combined irradiance of the laser beams 24', 24". The power level of each of the laser beams 24', 24" is preferably kept constant at that time. In an alternative embodiment, however, the power level of each of the laser beams 24', 24" may be increased during the movement of the focal points 66', 66" in order to enhance the irradiance gain. Still further, the power level of each of the laser beams 24', 24" may be decreased during movement of the focal points 66', 66" so long as the power level decrease does not fully offset the overall combined irradiance gain attained through movement of the focal points 66', 66". While the elevated level of the overall combined irradiance may vary based on the compositions and thicknesses 121, 141 of the first and second steel workpieces 12, 14—much like the initial overall combined irradiance level—the elevated overall combined irradiance level of the laser beams 24', 24" usually ranges from 1000 $W/cm^2$ to $1.0 \times 10^9$ $W/cm^2$ or, more narrowly, from $1.0 \times 10^5$ $W/cm^2$ to $1.0 \times 10^9$ $W/cm^2$.

The growth of the molten steel weld pool 92 during the increase in the overall combined irradiance level of the laser beams 24', 24" may be carried out with or without producing a keyhole inside of the weld pool 92. For example, as shown in FIG. 4, if any portion of the total projected sectional area 88 of laser beams 24', 24" has an irradiance that is great enough to vaporize the steel workpieces 12, 14 during the increase of the overall combined irradiance of the laser beams 24', 24" from its initial level to its elevated level, then a keyhole 98 is produced within the molten steel weld pool 92. The keyhole 98 is a column of vaporized steel that facilitates deep and narrow penetration of molten steel weld pool 92 into the workpiece stack-up 10. Alternatively, if no portion of the total projected sectional area 88 of the laser beams 24', 24" reaches an irradiance that is great enough to vaporize the steel workpieces 12, 14, then the keyhole 98 is not be produced. Under these circumstances, heat from the laser beams 24', 24" is spread through the workpiece stack-up 10 by conduction. While the exact irradiance needed to produce the keyhole 98 may vary based on the make-up of the workpiece stack-up 10, in general, an irradiance of $0.5 \times 10^6$ $W/cm^2$ and above at the plane 90 of the top surface 20 of the stack-up 10 is usually sufficent. And, depending on the interbeam spacing of the laser beams 24', 24", a single keyhole 98 may be produced or two separate keyholes 98—one for each laser beam 24', 24"—may be produced.

Figure 9:
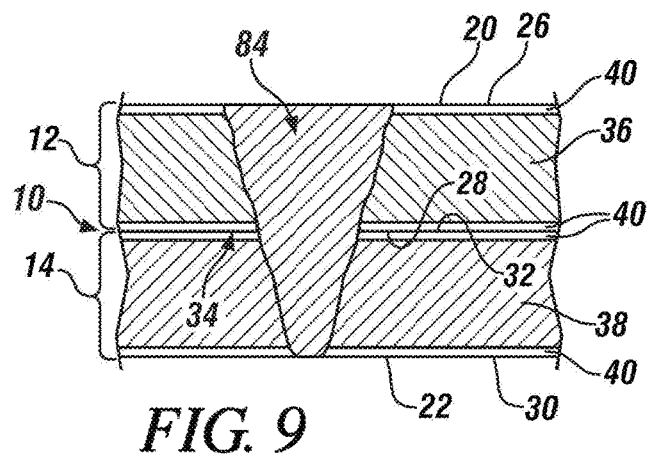
FIG. 9 is a cross-sectional side view of the workpiece stack-up shown in FIG. 3 after transmission of the laser beams has ceased and a laser spot weld joint has been formed between the steel workpieces.

Once the molten steel weld pool 92 penetrates the workpiece stack-up 10, as desired, the transmission of the laser beams 24', 24" is ceased at the weld site 16, as shown in FIG. 9. The transmission of the laser beams 24', 24" may be ceased without first changing the total projected sectional area 88 of the laser beams 24', 24" at the plane 90 of the top surface 20; that is, the total projected sectional area 88 attained when the elevated overall combined irradiance level of the laser beams 24', 24" is reached is maintained up until the transmission of the laser beams 24', 24" is ceased. Such a practice may be performed, for example, when the workpiece stack-up 10 is a 2T stack-up. In another embodiment, just before halting transmission of the laser beams 24', 24", the total projected sectional area 88 of the laser beams 24', 24" may be increased in order to decrease the overall combined irradiance of the laser beams 24', 24". This may be accomplish by moving the focal points 66', 66" of the laser beams 24', 24" forward (if distances 96', 96" are negative) or rearward (if distances 96', 96" are positive) along the longitudinal beam axes 70', 70" to lengthen the distances 96', 96" between the focal points 66', 66" and the top surface 20. In so doing, the overall combined irradiance of the laser beams 24', 24" is preferably decreased to somewhere between its elevated level and its initial level before ceasing transmission of the laser beams 24', 24". The practice of increasing the total projected sectional area 88 of the laser beams 24', 24" may be performed, for example, when the workpiece stack-up 10 is a 3T stack-up or when the workpiece stack-up is a 2T stack-up with a total thickness greater than 2 mm.

When transmission of the laser beams 24', 24" is ceased, the keyhole(s) 98, if present, collapse and the molten steel weld pool 92 cools and solidifies into the laser spot weld joint 84, which is comprised of resolidified composite steel workpiece material derived from each of the first and second steel workpieces 12, 14. The resolidified composite steel workpiece material of the laser spot weld joint 84 intersects the faying interface 34 of the two overlapping steel workpieces 12, 14 and autogenously fusion welds the workpieces 12, 14 together at the weld site 16. The laser spot weld joint 84, moreover, is less liable to be adversely affected by the surface coating 40 included in one or both of the steel workpieces 12, 14 due to the increase in the overall combined irradiance of the laser beams 24', 24" that transpires during the disclosed laser spot welding method. Indeed, increasing the overall combined irradiance of the laser beams 24', 24" from the initial level to the elevated level while reducing the total projected sectional area 88 of the laser beams 24', 24" at the plane 90 of the top surface 20 of the workpiece stack-up 10 is believed to promote good strength and other mechanical properties in the weld joint 84.

Without being bound by theory, it is believed that increasing the overall combined irradiance of the laser beams 24', 24" helps disrupt the surface coating 40 that is included in at least one of the first or second steel workpieces 12, 14 so that less weld defects are derived from the coating(s) 40. For instance, if one or both of the steel workpieces 12, 14 includes a zinc-based surface coating, the initial low overall combined irradiance level of the laser beams 24', 24" may burn and/or oxidize the zinc into high melting-temperature zinc oxides early in the laser spot welding process, thus limiting the amount of zinc that may vaporize and become entrained in the molten steel weld pool 92. Moreover, because the issues related to zinc vapors can be effectively dealt with by adjusting the overall combined irradiance of the laser beams 24', 24", there is no need to create protruding features (by laser scoring, mechanical dimpling, etc.) on either of the faying surfaces 28, 32, of the steel workpieces 12, 14 in order to attain good strength in the laser spot weld joint 84. Similarly, if one or both of the steel workpieces 12, 14 includes an aluminum-based surface coating, the initial low overall combined irradiance level may melt or disrupt the aluminum-based surface coating(s) early in the laser spot welding process, which can result in less aluminum or aluminum alloy contamination in the molten steel weld pool 92.

The embodiment described above constitutes one way to increase the overall combined irradiance of the laser beams 24', 24" by reducing the total projected sectional area 88 of the laser beams 24', 24" at the plane 90 of the top surface 20 of the workpiece stack-up 10. There are, of course, other ways to achieve this same objective. One such alternative embodiment is illustrated schematically in FIGS. 10-13. Since the above discussion of the first and second steel workpieces 12, 14 and the conventional laser welding apparatus 18 are equally applicable here and need not be repeated, the following discussion is focused only on the laser beams 24', 24" and how they relate to the workpiece stack-up 10 during formation of the laser spot weld joint 84. To be sure, the movement of the laser beams 24', 24" detailed in FIGS. 10-13, and described in the following text, can be achieved, like before, by moving the laser optic welding head 42 in the space above the top surface 20 of the workpiece stack-up 10.

Figure 10:
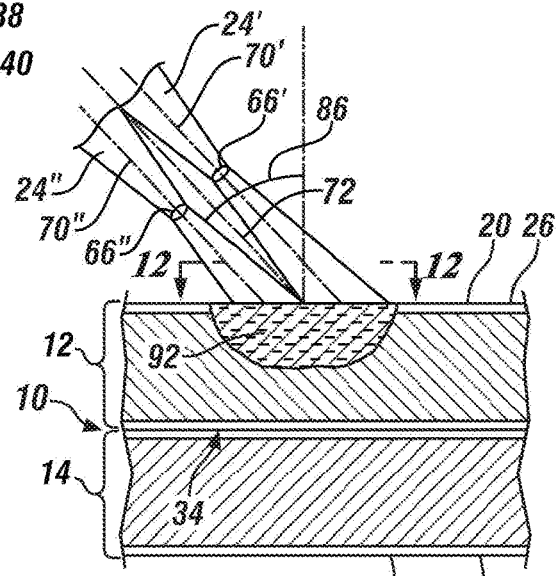
FIG. 10 is a cross-sectional side view of the workpiece stack-up shown in FIGS. 1-2 during laser spot welding in which the laser beams have an initial overall combined irradiance level at the top surface of the workpiece stack-up according to another embodiment.
Figure 12:
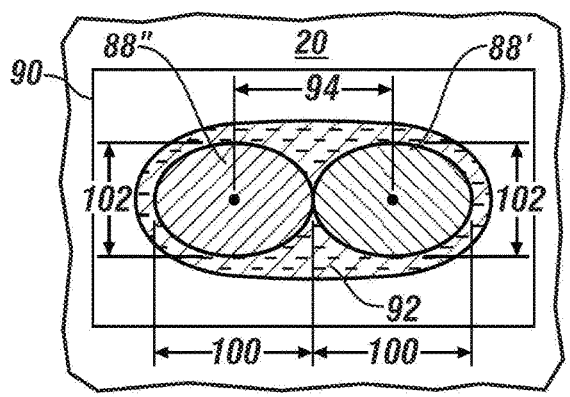
FIG. 12 is a plan view of the total projected sectional area of the laser beams at a plane of the top surface of the workpiece stack-up when the mean angle of incidence of the laser beams is set as illustrated in FIG. 10.

In the alternative embodiment of the disclosed laser spot welding method, the overall combined irradiance of the laser beams 24', 24" is increased by adjusting the mean angle of incidence 86 of the laser beams 24', 24". Specifically, when the laser beams 24', 24" are first trained on the weld site 16, the initial overall combined irradiance level of the laser beams 24', 24" is established by setting the mean angle of incidence 86 of the laser beams 24', 24" to anywhere between 1° and 45° or, more narrowly, to between 2° and 20°, as shown in FIGS. 10 and 12. At the same time, the focal points 66', 66" of the laser beams 24', 24" may be positioned relative to the top surface 20 of the workpiece stack-up 10 at a distance 96', 96" that ranges between −300 mm and 300 mm or, more narrowly, between −60 mm and 60 mm. Angling the mean longitudinal beam axis 72 of the laser beams 24', 24" relative to the top surface 20 renders the projected sectional areas 88', 88" of each of the laser beams 24', 24" elliptical in shape. Each of the individual projected sectional areas 88', 88" thus has a major diameter 100 and a minor diameter 102 (FIG. 12). And, since the projected sectional areas 88', 88" are elliptical at this time, they each have an eccentricity (e) that represents how much the elliptical shape has deviated from a circle. In particular, the eccentricity of an ellipse ranges from 0 (circle) to a value between 0 and 1, with an increase in the ratio of the major diameter 100 to the minor diameter 102 resulting in an increase in eccentricity, and vice versa.

Figure 11:
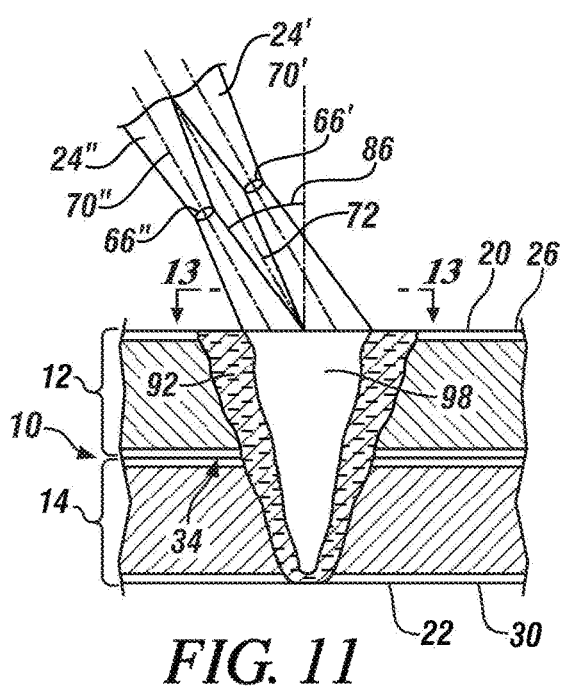
FIG. 11 is a cross-sectional side view of the workpiece stack-up shown in FIG. 10 during laser spot welding in which the overall combined irradiance of the laser beams at the top surface of the stack-up has been increased from its initial level (FIG. 10) to an elevated level, and wherein the elevated overall combined irradiance level of the laser beams is achieved by reducing the mean angle of incidence of the laser beams to reduce the eccentricity of the individual projected sectional areas of the laser beams at the plane of the top surface.
Figure 13:
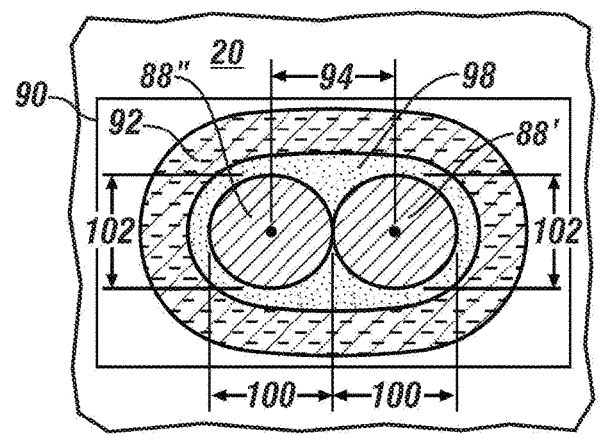
FIG. 13 is a plan view of the total projected sectional area of the laser beams at a plane of the top surface of the workpiece stack-up when the mean angle of incidence of the laser beams is set as illustrated in FIG. 11.

After the laser beams 24', 24" have been trained on the top surface 20 of the workpiece stack-up 10 at the initial overall combined irradiance level, and the molten steel weld pool 92 has been created, the overall combined irradiance is of the laser beams 24', 24" is increased to the elevated level to grow the weld pool 92 and cause it to penetrate further into the workpiece stack-up 10 towards the bottom surface 22, as before. With reference now to FIGS. 11 and 13, the overall combined irradiance of the laser beams 24', 24" is increased by reducing the mean angle of incidence 86 of the laser beams 24', 24" which, in turn, reduces the eccentricity of each of the individual projected sectional areas 88', 88" of the laser beams 24', 24" at the plane 90 of the top surface 20 and, consequently, the total projected sectional area 88; that is, the mean longitudinal beam axis 72 of the laser beams 24', 24" is brought to a more vertical position to reduce the ratio of the major diameter 100 to the minor diameter 102 of the elliptically-shaped individual projected sectional areas 88', 88" of the laser beams 24', 24", thus rendering the individual projected sectional areas 88', 88" less elliptical and more circular as shown in FIG. 13. The mean angle of incidence 86 of the laser beams 24', 24" may be set to anywhere between 0° and 30° or, more narrowly, to between 0° and 20°, in order to establish the elevated overall combined irradiance level of the laser beams 24', 24".

Moreover, in order to further reduce the total projected sectional area 88 of the laser beams 24', 24" at the plane 90 of the top surface 20 of the workpiece stack-up 10 during realization of the elevated overall combined irradiance level, the focal points 66', 66" of the laser beams 24', 24" may be moved to shorten the focal distances 96', 96" between the focal points 66', 66" and the top surface 20 of the workpiece stack-up 10, as described above. That is, the focal points 66', 66" of the laser beams 24', 24" may be moved forward (if distances 96', 96" are positive) along their longitudinal beam axes 70', 70" in the propagation direction or rearward (if distances 96', 96" are negative) along the longitudinal beam axes 70', 70" opposite to the propagation direction. For instance, the focal distances 96', 96" may be shortened to between −280 mm and 280 mm or, more narrowly, to between −50 mm and 50 mm, either before or during or after the mean angle of incidence 86 of the laser beams 24', 24" has been reduced. Of course, like before, the power level of each of the laser beams 24', 24" may be kept constant during the reduction of the mean angle of incidence 86 of the laser beams 24', 24" and the optional movement of the focal points 66', 66", or it may be increased or decreased (so long as the power level decrease does not fully offset the overall combined irradiance gain attained through the reduction of the mean angle of incidence 86 and the optional movement of the focal points 66', 66").

Once the molten steel weld pool 92 penetrates the workpiece stack-up 10, as desired, the transmission of the laser beams 24', 24" is ceased at the weld site 16 in generally the same manner as set forth above with regards to FIG. 9. To reiterate, the transmission of the laser beams 24', 24" may be ceased without first changing the total projected sectional area 88 of the laser beams 24', 24" at the plane 90 of the top surface 20, or, alternatively, the total projected sectional area 88 of the laser beams 24', 24" may be increased in order to decrease the overall combined irradiance of the laser beams 24', 24". Here, in this embodiment, the increase in the total projected sectional area 88 of the laser beams 24', 24" may be accomplished by increasing the mean angle of incidence 86 of the laser beams 24', 24" which, in turn, increases the eccentricity of each of the individual projected sectional areas 88', 88" of the laser beams 24', 24" at the plane 90 of the top surface 20. If such a technique is practiced, the overall combined irradiance of the laser beams 24', 24", like before, is preferably decreased to somewhere between its elevated level and its initial level before transmission of the laser beams 24', 24" is ceased.

Figure 14:
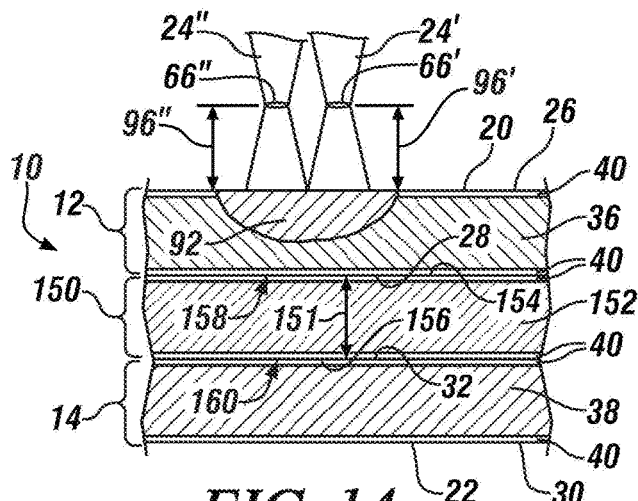
FIG. 14 is a cross-sectional side view of the workpiece stack-up during laser spot welding in which the laser beams have an initial overall combined irradiance level at the top surface of the workpiece stack-up according to one embodiment, wherein the view in this Figure is taken from the same perspective as shown in FIG. 3, although here the workpiece stack-up includes three steel workpieces that establish two faying interfaces, as opposed to two steel workpieces that establish a single faying interface.
Figure 15:
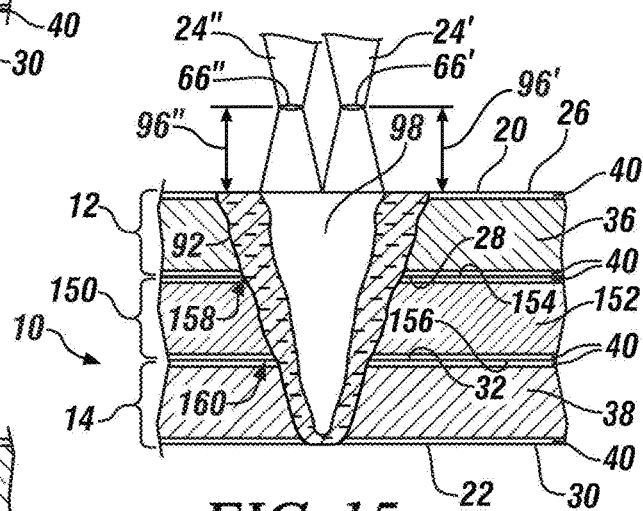
FIG. 15 is a cross-sectional side view of the workpiece stack-up shown in FIG. 14 during laser spot welding in which the overall combined irradiance of the laser beams at the top surface of the stack-up has been increased from its initial level (FIG. 14) to an elevated level.
Figure 16:
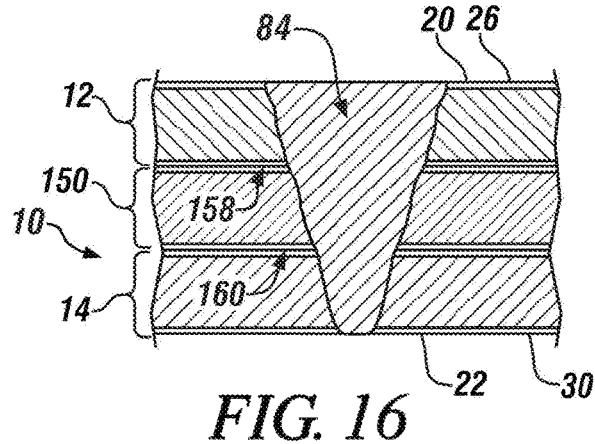
FIG. 16 is a cross-sectional side view of the workpiece stack-up shown in FIG. 14 after transmission of the laser beams has ceased and a laser spot weld joint has been formed between the steel workpieces.

FIGS. 1-13 illustrate the above-described embodiments in the context of the workpiece stack-up 10 being a "2T" stack-up that includes only the first and second steel workpieces 12, 14 with a single faying interface 34. The same embodiments of the disclosed laser spot welding method, however, may also be carried out when the workpiece stack-up 10 is a "3T" stack-up that includes an additional third steel workpiece 150, having a thickness 151, that overlaps and is situated between the first and second steel workpieces 12, 14, as depicted in FIGS. 14-16. In fact, regardless of whether the workpiece stack-up 10 is 2T or 3T stack-up, the laser spot welding method does not have to be modified all that much to form the laser spot weld joint 84. And, in each instance, the laser spot weld joint 84 can achieve good quality strength properties despite the fact that at least one, and sometimes all, of the steel workpieces 12, 14 (and optionally 150) includes a surface coating 40 comprised of a zinc-based material or an aluminum-based material.

Referring now to FIGS. 14-15, the additional third steel workpiece 150, if present, includes a third base steel substrate 152 that may be bare or coated with the same surface coating 40 described above. When the workpiece stack-up 10 includes the first, second, and third overlapping steel workpieces 12, 14, 150, the base steel substrate 36, 38, 152 of at least one of the steel workpieces 12, 14, 150, and sometimes all of them, includes the surface coating 40. As for the characteristics (e.g., composition, thickness, etc.) of the third base steel substrate 152, the descriptions above regarding the first and second base steel substrates 36, 38 are equally applicable to that substrate 152 as well. It should be noted, though, that while the same general descriptions apply to the several steel workpieces 12, 14, 150, there is no requirement that the steel workpieces 12, 14, 150 be identical to one another. In many instances, the first, second, and third steel workpieces 12, 14, 150 are different in some aspect from each other whether it be composition, thickness, and/or form.

As a result of stacking the first, second, and third steel workpieces 12, 14, 150 in overlapping fashion to provide the workpiece stack-up 10, the third steel workpiece 150 has two faying surfaces 154, 156. One of the faying surfaces 154 overlaps and confronts the first faying surface 28 of the first steel workpiece 12 and the other faying surface 156 overlaps and confronts the second faying surface 32 of the second steel workpiece 14, thus establishing first and second faying interfaces 158, 160 within the workpiece stack-up 10 that extend through the weld site 16. These faying interfaces 158, 160 are the same type and encompass the same attributes as the faying interface 34 already described above with respect to FIGS. 1-13. Consequently, in this embodiment as described herein, the exterior outer surfaces 26, 30 of the flanking first and second steel workpieces 12, 14 still face away from each other in opposite directions and constitute the top and bottom surfaces 20, 22 of the workpiece stack-up 10.

Forming the molten steel weld pool 92, and optionally producing the keyhole(s) 98 within the weld pool 92, is carried out when the workpiece stack-up 10 includes the first, second, and third steel workpieces 12, 14, 150 by directing the laser beams 24', 24" at the workpiece stack-up 10 such that they impinge the top surface 20 at the weld site 16, as shown in FIG. 14. The overall combined irradiance of the laser beams 24', 24" at the top surface 20 of the workpiece stack-up 10 is then increased from an initial level to an elevated level by reducing the total projected sectional area 88 of the laser beam 24', 24" at the plane 90 of the top surface 20 of the stack-up 10 as previously described and as shown in FIG. 15. This may involve moving the focal points 66', 66" of the laser beams 24', 24" relative to the top surface 20 of the workpiece stack-up 10 to shorten the focal distances 96', 96" between the focal points 66', 66" and the top surface 20 and/or reducing the mean angle of incidence 86 of the laser beams 24', 24" to reduce the eccentricity of the elliptical nature of the individual projected sectional areas 88', 88" of the laser beams 24', 24". After the increase in the overall combined irradiance of the laser beams 24', 24" has grown the molten steel weld pool 92 to the desired size and the desired depth of penetration, the transmission of the laser beams 24', 24" is ceased at the weld site 16, and the laser spot weld joint 84 is obtained from the molten steel weld pool 92 as depicted in FIG. 16.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser spot welding overlapping steel workpieces, the method comprising:
   providing a workpiece stack-up that includes overlapping steel workpieces, the workpiece stack-up comprising at least a first steel workpiece and a second steel workpiece, the first steel workpiece providing a top surface of the workpiece stack-up and the second steel workpiece providing a bottom surface of the workpiece stack-up, wherein a faying interface is established between each pair of adjacent overlapping steel workpieces within the workpiece stack-up, and wherein at least one of the steel workpieces in the workpiece stack-up includes a surface coating comprised of a zinc-based material or an aluminum-based material;
   directing a plurality of laser beams at the top surface of the workpiece stack-up, the laser beams impinging the top surface and creating a molten steel weld pool that penetrates into the workpiece stack-up from the top surface towards the bottom surface, each of the laser beams having an individual projected sectional area at a plane of the top surface of the workpiece stack-up that, in combination, provide a total projected sectional area of the laser beams;
   increasing an overall combined irradiance of the laser beams at the top surface of the workpiece stack-up from an initial level to an elevated level by reducing the total projected sectional area of the laser beams at the plane of the top surface of the workpiece stack-up, the increase in the overall combined irradiance from the initial level to the elevated level causing the molten steel weld pool to grow and to further penetrate into the workpiece stack-up towards the bottom surface; and
   ceasing transmission of the laser beams to allow the molten steel weld pool to solidify into a laser spot weld joint comprised of resolidified composite steel workpiece material derived from each of the steel workpieces in the workpiece stack-up, the resolidified composite steel workpiece material of the laser spot weld joint intersecting each of the faying interfaces within the workpiece stack-up to fusion weld the steel workpieces together.

2. The method set forth in claim 1, wherein the first steel workpiece has an exterior outer surface and a first faying surface, and the second steel workpiece has an exterior outer surface and a second faying surface, the exterior outer surface of the first steel workpiece providing the top surface of the workpiece stack-up and the exterior outer surface of the second steel workpiece providing the bottom surface of the workpiece stack-up, and wherein the first and second faying surfaces of the first and second steel workpieces overlap and confront each other to establish a faying interface.

3. The method set forth in claim 1, wherein the first steel workpiece has an exterior outer surface and a first faying surface, and the second steel workpiece has an exterior outer surface and a second faying surface, the exterior outer surface of the first steel workpiece providing the top surface of the workpiece stack-up and the exterior outer surface of the second steel workpiece providing the bottom surface of the workpiece stack-up, and wherein the workpiece stack-up comprises an additional third steel workpiece situated between the first and second steel workpieces, the third steel workpiece having opposed faying surfaces, one of which overlaps and confronts the first faying surface of the first steel workpiece to establish a first faying interface and the other of which overlaps and confronts the second faying surface of the second steel workpiece to establish a second faying interface.

4. The method set forth in claim 1, wherein each of the steel workpieces in the workpiece stack-up includes a surface coating comprised of a zinc-based material or an aluminum-based material.

5. The method set forth in claim 1, wherein at least one keyhole is produced within the molten steel weld pool when increasing the overall combined irradiance of the laser beams from the initial level to the elevated level.

6. The method set forth in claim 1, wherein the initial overall combined irradiance level of the laser beams ranges from 500 W/cm$^2$ to $1.0 \times 10^6$ W/cm$^2$, and wherein the elevated overall combined irradiance level of the laser beams ranges from 1000 W/cm$^2$ to $1.0 \times 10^9$ W/cm$^2$.

7. The method set forth in claim 1, wherein each of the laser beams propagates towards the top surface along a longitudinal beam axis and further includes a focal point positioned a distance relative to the top surface along the longitudinal beam axis, and wherein increasing the overall combined irradiance of the laser beams at the top surface of the workpiece stack-up comprises moving the focal point of each of the laser beams along its respective longitudinal beam axis so as to shorten the distance between the focal point of each laser beam and the top surface of the workpiece stack-up.

8. The method set forth in claim 7, wherein the distance between the focal point of each of the laser beams and the top surface of the workpieces stack-up along its respective longitudinal beam axis is reduced from between −300 mm and 300 mm to between −280 mm and 280 mm.

9. The method set forth in claim 1, wherein the laser beams propagate towards the top surface along a mean longitudinal beam axis and impinge the top surface at a mean angle of incidence to thereby render the individual projected sectional area of each laser beam elliptical in shape at the plane of the top surface, and wherein increasing the overall combined irradiance of the laser beams at the top surface of the workpiece stack-up comprises reducing the mean angle of incidence of the laser beams so as to reduce an eccentricity of each individual projected sectional area of the laser beams at the plane of the top surface.

10. The method set forth in claim 9, wherein the mean angle of incidence of the laser beams is reduced from between 1° and 45° to between 0° and 30°.

11. The method set forth in claim 1, wherein increasing the overall combined irradiance of the laser beams from the initial level to the elevated level grows the molten steel weld pool such that the molten steel weld pool penetrates all the way through second steel workpiece and breaches the bottom surface of the workpiece stack-up.

12. The method set forth in claim 1, wherein directing the laser beams at the top surface of the workpiece stack-up comprises emitting the laser beams from a laser optic welding head positioned above the top surface of the workpiece stack-up, the laser optic welding head including a beamsplitter and a focusing element, the beamsplitter functioning to split a collimated laser beam into a plurality of output collimated laser beams, and the focusing element functioning to focus each of the output collimated laser beams into the plurality of laser beams that propagate forward towards the top surface of the workpiece stack-up, the focusing element converging each of the laser beams to a focal point that has a focal length between 50 mm and 350 mm.

13. The method set forth in claim 1, wherein the laser beam is a solid-state laser beam.

14. The method set forth in claim 1, wherein the plurality of laser beams includes a first laser beam and a second laser beam, the first laser beam having a first longitudinal beam axis and the second laser beam having a second longitudinal beam axis, and wherein the first and second longitudinal beam axes of the first and second laser beams, respectively, are parallel or converge toward one another down their longitudinal beam axes.

15. A method of laser spot welding overlapping steel workpieces, the method comprising:

providing a workpiece stack-up that includes overlapping steel workpieces, the workpiece stack-up comprising at least a first steel workpiece and a second steel workpiece, the first steel workpiece providing a top surface of the workpiece stack-up and the second steel workpiece providing a bottom surface of the workpiece stack-up, wherein a faying interface is established between each pair of adjacent overlapping steel workpieces within the workpiece stack-up, and wherein at least one of the steel workpieces in the workpiece stack-up includes a surface coating comprised of a zinc-based material or an aluminum-based material;

positioning a laser optic welding head to direct a first laser beam and a second laser beam at the top surface of the workpiece stack-up such that the first and second laser beams impinge the top surface at a weld site and create a molten steel weld pool that penetrates into the workpiece stack-up, the laser optic welding head including a beamsplitter and a focusing element, the beamsplitter functioning to split a collimated laser beam into first and second output collimated laser beams, and the focusing element functioning to focus each of the first and second output collimated laser beams into the first and second laser beams that ultimately impinge the top surface of the workpiece stack-up, the focusing element converging each of the first and second laser beams to a focal point that has a focal length between 50 mm and 350 mm;

increasing an overall combined irradiance of the first and second laser beams at the top surface of the workpiece stack-up from an initial level to an elevated level by reducing a total projected sectional area of the first and second laser beams at a plane of the top surface of the workpiece stack-up, the increase in the overall combined irradiance from the initial level to the elevated level causing the molten steel weld pool to grow and to further penetrate into the workpiece stack-up towards the bottom surface; and ceasing transmission of the first and second laser beams to allow the molten steel weld pool to solidify into a laser spot weld joint comprised of resolidified composite steel workpiece material derived from each of the steel workpieces in the workpiece stack-up, the resolidified composite steel workpiece material of the laser spot weld joint intersecting each of the faying interfaces within the workpiece stack-up to fusion weld the steel workpieces together.

16. The method set forth in claim 15, wherein the workpiece stack-up includes only the first and second steel workpieces, or wherein the workpiece stack-up further includes an additional third steel workpiece disposed between the first and second steel workpieces.

17. The method set forth in claim 15, wherein the initial overall combined irradiance level of the first and second laser beams ranges from 500 W/cm$^2$ to $1.0 \times 10^6$ W/cm$^2$, and wherein the elevated overall combined irradiance level of the first and second laser beams ranges from 1000 W/cm$^2$ to $1.0 \times 10^9$ W/cm$^2$.

18. The method set forth in claim 15, wherein each of the focal point of the first laser beam and the focal point of the second laser beam is positioned a distance relative to the top surface of the workpiece stack-up, and wherein increasing the overall combined irradiance of the first and second laser beams comprises moving the laser optic welding head to move the focal points of the first and second laser beams so as to shorten the distance between the focal points and the top surface of the workpiece stack-up.

19. The method set forth in claim 15, wherein the first and second laser beams propagate towards the top surface of the workpiece stack-up at a mean angle of incidence that renders an individual projected sectional area of the first laser beam and an individual projected sectional are of the second laser beam elliptical in shape at a plane of the top surface, and wherein increasing the overall combined irradiance of the first and second laser beams comprises moving the laser optic welding head to reduce the mean angle of incidence of the first and second laser beams so as to reduce an eccentricity of the individual projected sectional area of the first laser beam and the individual projected sectional area of the second laser beam at the plane of the top surface.

20. The method set forth in claim 15, wherein at least one keyhole is produced within the molten steel weld pool when increasing the overall combined irradiance of the first and second laser beams from the initial level to the elevated level.

* * * * *